US008923245B2

(12) United States Patent
Jung et al.

(10) Patent No.: US 8,923,245 B2
(45) Date of Patent: Dec. 30, 2014

(54) METHOD AND APPARATUS FOR HANDOVER IN A MOBILE COMMUNICATION SYSTEM

(75) Inventors: In-Uk Jung, Gyeonggi-Do (KR); Jin Lee, Gyeonggi-Do (KR); Yong-Ho Kim, Gyeonggi-Do (KR); Ki-Seon Ryu, Gyeonggi-Do (KR)

(73) Assignee: LG Electronics Inc., Seoul (KR)

( * ) Notice: Subject to any disclaimer, the term of this patent is extended or adjusted under 35 U.S.C. 154(b) by 574 days.

(21) Appl. No.: 13/258,434

(22) PCT Filed: Mar. 24, 2010

(86) PCT No.: PCT/KR2010/001802
§ 371 (c)(1),
(2), (4) Date: Sep. 21, 2011

(87) PCT Pub. No.: WO2010/110594
PCT Pub. Date: Sep. 30, 2010

(65) Prior Publication Data
US 2012/0008596 A1   Jan. 12, 2012

Related U.S. Application Data

(60) Provisional application No. 61/163,444, filed on Mar. 25, 2009.

(51) Int. Cl.
*H04W 36/00* (2009.01)
(52) U.S. Cl.
CPC ................................. *H04W 36/0033* (2013.01)
USPC ........... 370/331; 370/252; 455/436; 455/437; 455/439; 455/438
(58) Field of Classification Search
CPC ..... H04W 36/00; H04W 76/06; H04W 48/08; H04W 36/30; H04W 36/32; H04W 36/08
USPC ........... 370/331, 252; 455/436, 437, 439, 438
See application file for complete search history.

(56) References Cited

U.S. PATENT DOCUMENTS

| | | | | |
|---|---|---|---|---|
| 8,027,308 | B1* | 9/2011 | Narendran et al. | 370/331 |
| 8,059,605 | B2* | 11/2011 | Yeou et al. | 370/332 |
| 2005/0208945 | A1 | 9/2005 | Hong et al. | |
| 2005/0288023 | A1* | 12/2005 | Kim et al. | 455/439 |
| 2007/0010262 | A1 | 1/2007 | Kang et al. | |
| 2009/0180451 | A1* | 7/2009 | Alpert et al. | 370/338 |

FOREIGN PATENT DOCUMENTS

| | | |
|---|---|---|
| KR | 1020090018317 | 2/2009 |
| WO | 2010110594 | 9/2010 |

* cited by examiner

*Primary Examiner* — Charles C Jiang
*Assistant Examiner* — Jamal Javaid
(74) *Attorney, Agent, or Firm* — Lee, Hong, Degerman, Kang & Waimey

(57) ABSTRACT

The present invention relates to a handover method for a mobile communication system. The handover method according to the present invention informs a current state to a serving base station(BS) when a re-entry process has been delayed or a handover has failed due to an error occurred in the handover procedure during handover, and receives from the serving BS a status information response message containing available interval and unavailable interval reset information and link disconnection time reset information for extending the link disconnection time. So, the present invention minimizes or prevents a handover delay or extend a link disconnection time with the serving BS, thereby allowing a terminal to receive a continuous service even during the handover procedure.

5 Claims, 3 Drawing Sheets

METHOD AND APPARATUS FOR HANDOVER IN A MOBILE COMMUNICATION SYSTEM

CROSS-REFERENCE TO RELATED APPLICATIONS

This application is the National Stage filing under 35 U.S.C. 371 of International Application No. PCT/KR2010/001802, filed on Mar. 24, 2010, which claims priority to U.S. Provisional Application Ser. No. 61/163,444, filed on Mar. 25, 2009, the contents of all of which are incorporated by reference herein in their entireties.

TECHNICAL FIELD

The present disclosure relates to a method and apparatus for handover in a broadband wireless communication system, and more particularly, a handover method and apparatus for resetting a network re-entry interval due to an error occurrence during Entry Before Break (EBB) handover.

BACKGROUND ART

A handover technology for allowing a terminal to continuously receive a service provided from a base station during moving for ensuring mobility of the terminal in a wireless communication system has been proposed. The handover refers to a technology that as a terminal moves from a serving base station (BS) in which the terminal is receiving a service to another base station (Target BS), data contexts which are currently transmitted/received to/from the serving BS are transferred to the target BS with a minimum interruption time for continuous communication. The handover technology may ensure the service continuity for the mobile terminal.

Especially, among various types of handovers, an Entry Before Break (EBB) handover of disconnecting a link to the serving BS after entry into the target BS in a state of maintaining the link connected to the serving BS has an advantage of enabling a continuous data reception from the serving BS even during handover.

However, during the EBB handover, if a re-entry process to the target BS has been delayed or the handover has failed due to an error occurred in the handover procedure, there is no way to inform the current state to the serving BS. Consequently, a continuous service from the serving BS cannot be guaranteed or a handover delay may be caused.

DISCLOSURE OF THE INVENTION

Therefore, to obviate those problems, an aspect of the detailed description is to provide a method and apparatus for informing a current state to a serving BS when a re-entry process has been delayed or a handover has failed due to an error occurred in the handover procedure during handover.

Also, another aspect of the detailed description is to provide a method and apparatus for continuously receiving a service by minimizing or preventing a handover delay or extending a link disconnection time with the serving BS by virtue of informing status information relating to an error occurrence during handover to the serving BS.

To achieve these and other advantages and in accordance with the purpose of the present invention, as embodied and broadly described herein, there is provided a handover method including receiving from a serving base station a handover command message, the message containing target base station information, information on an available interval enabling data transmission/reception, to/from the serving base station during handover, information on an unavailable interval not enabling data transmission/reception during handover, and information on the time of disconnection of a link connected to the serving base station, performing a network entry process with the target base station, transmitting status information to the serving base station when an error has occurred in the network entry process, receiving from the serving base station a status information response message containing available interval and unavailable interval reset information and link disconnection time reset information for extending the link disconnection time, enabling the serving base station to provide a data transmitting/receiving service during the available interval, and re-performing the network entry process with the target base station to disconnect the link to the serving base station at the reset link disconnection time.

Preferably, the handover command message may further contain information on a service level expected to be provided by the target base station, and information on an action time for initiating the network entry process with the target base station.

Preferably, the status information may be transmitted by being included in a Medium Access Control (MAC) management message, a piggyback or a Channel Quality Indicator Channel (CQICH).

Preferably, the status information may include at least one of information on a type of the network entry process, information on a cause and an occurrence time point of the error, and action request information requested from the serving base station.

Preferably, the network entry process with the target base station may be a CDMA code ranging or a ranging process through a MAC message. Also, when the CDMA code ranging or the MAC message ranging has failed, error information may be received from the target base station through a ranging response message.

In accordance with another exemplary embodiment, a handover method in a mobile communication system may include receiving from a serving base station a handover command message, the handover command message containing target base station information, information on an available interval enabling data transmission/reception to/from the serving base station during handover, information on an unavailable interval not enabling data transmission/reception during handover, and information on the time of disconnection of a link connected to the serving base station, transmitting a ranging request message for an uplink channel synchronization to the target base station for the unavailable interval, transmitting status information to the serving base station for the available interval when an error or failure for the ranging request has occurred, receiving a status information response message from the serving base station, the status information response message containing available interval and unavailable interval reset information and link disconnection time reset information for extending the link disconnection time, and receiving a data transmission/reception service from the serving base station for the available interval or the reset available interval.

Preferably, the method may further include transmitting a ranging request message to the target base station for the reset unavailable interval, acquiring uplink synchronization and receiving allocated resources from the target base station, and disconnecting the link to the serving base station at the reset link disconnection time.

Preferably, the status information may be transmitted by being included in a Medium Access Control (MAC) management message, a piggyback or a Channel Quality Indicator Channel (CQICH).

Preferably, the status information may include information on a cause and an occurrence time point of the error or action request information requested from the serving base station.

Preferably, when the ranging failure has occurred, error information may be received from the target base station through a ranging response message.

In accordance with one exemplary embodiment of the present disclosure, a handover apparatus may include a transmitting unit configured to transmit to a terminal a handover command message, the handover command message containing target base station information, information on an available interval enabling data transmission/reception to/from the terminal during handover, information on an unavailable interval not enabling data transmission/reception during handover, and information on the time of disconnection of a link connected to the terminal, a receiving unit configured to receive error status information from the terminal when an error has occurred while the terminal is executing a ranging for handover with the target base station for the unavailable interval; and a controller configured to reset the available interval, the unavailable interval and the link disconnection time based upon the received error status information, and control the transmitting unit to transmit the reset available interval, unavailable interval and link disconnection time to the terminal.

In accordance with one exemplary embodiment of the present disclosure, a terminal for performing handover may include a receiving unit configured to receive from the serving base station a handover command message, the handover command message containing target base station information, information on an available interval enabling data transmission/reception to/from the serving base station during handover, information on an unavailable interval not enabling data transmission/reception during handover, and information on the time of disconnection of a link connected to the serving base station, a transmitting unit configured to transmit a ranging request message for handover to the target base station, and a controller configured to determine whether or not an error has occurred in the ranging process for handover with the target base station, wherein when an error or failure has occurred in the ranging process for handover with the target base station, error status information may be transmitted to the serving base station for the available interval and a status information response message may be received from the serving base station to extend the link disconnection time to the serving base station, the status information response message containing available interval and unavailable interval reset information and link disconnection time reset information for extending the link disconnection time.

Preferably, the status information may be reported to the serving base station by being included in a Medium Access Control (MAC) management message, a piggyback or a Channel Quality Indicator Channel (CQICH).

Preferably, the status information may include information on a cause and an occurrence time point of the error reason or action request information requested from the serving base station.

Advantageous Effect

In accordance with the detailed description, when a re-entry process to a target BS has been delayed or a handover failure has occurred due to an error occurred in the handover procedure during EBB handover, the current state is informed to a serving BS, so as to minimize or prevent a handover delay or extend a link disconnection time with the serving BS, thereby allowing a terminal to receive a continuous service even during the handover procedure.

MODES FOR CARRYING OUT THE PREFERRED EMBODIMENTS

Figure 1:
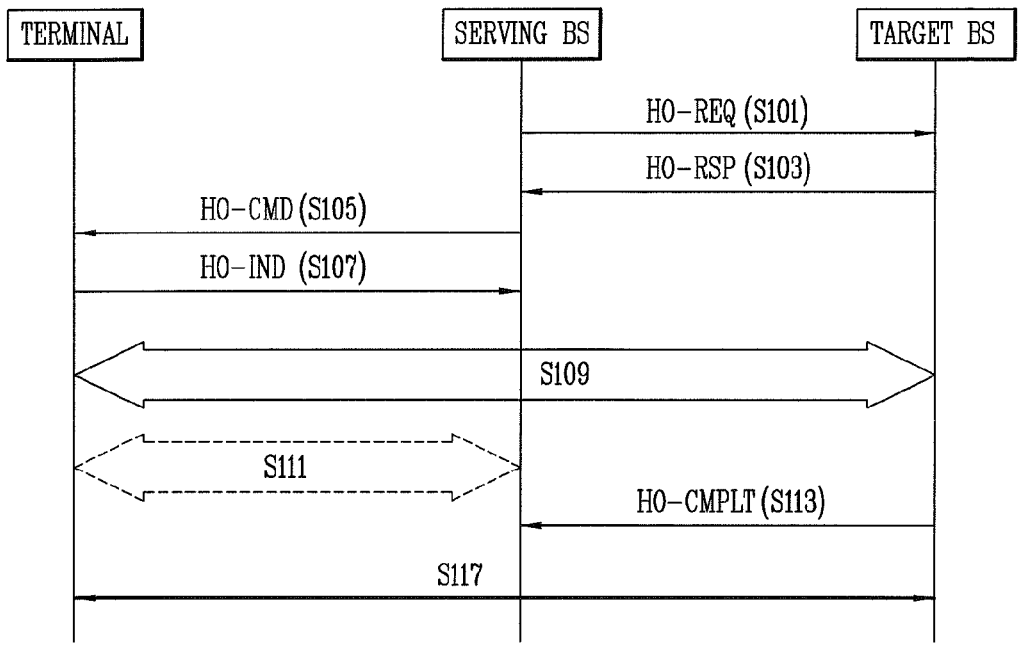
FIG. 1 is a view illustrating a handover procedure in accordance with a handover command from a base station.

Reference will now be made in detail to the preferred embodiments of this specification, examples of which are illustrated in the accompanying drawings. It should be understood that the description herein will be given of essential parts required to understand operations according to this specification and description of the other parts will be omitted to obviate obscurity of the point of the invention. The accompanying drawings are merely illustrative to help understanding of the present disclosure, and should not be construed as limiting the scope of the present disclosure.

A communication system used herein is a system for providing various communication services such as voice data, packet data and the like, and includes a base station and a terminal. Examples of the communication systems may include a Long Term Evolution (LTE) system, LTE-advanced system, IEEE802.16e system, IEEE802.16m system and the like. Especially, IEEE802.16m system whose standardization is actively ongoing is a system, which meets IMT-advanced system requirements with maintaining compatibility with the existing 802.16 standard-based terminal and base station equipment. Hereinafter, description will be given of the IEEE802.16m as a representative example.

The term 'terminal' used herein may be replaced with Subscriber Station (SS), User Equipment (UE), Mobile Equipment (ME) and Mobile Station (MS). Also, the terminal may be a portable device supporting a communication function during movement, such as a Personal Digital Assistant (PDA), smart phone, a laptop computer and the like.

The term 'base station' used herein refers to a fixed position communicating with the terminal, and may be replaced with other terms, such as Base Station (BS), evolved-NodeB (eNB), Base Transceiver System (BTS), Access Point (AP) and the like. One or more cells may exist in one base station, and an interface for transmission of user traffic and control traffic may be used between base stations. Also, downlink refers to a communication channel from the base station to the terminal, and uplink refers to a communication channel from the terminal to the base station.

Multi-access schemes applied to the wireless communication system may include Code Division Multiple Access (CDMA), Time Division Multiple Access (TDMA), Frequency Division Multiple Access (FDMA), Single Carrier-FDMA (SC-FDMA), Orthogonal Frequency Division Multiple Access (OFDMA) or other known modulation schemes.

Also, multiple access schemes for the downlink transmission and the uplink transmission may differ. For example, the downlink transmission may employ an OFDMA scheme, and the uplink transmission may employ an SC-FDMA scheme.

Handover (or handoff) refers to switching a link to a serving BS, which is currently in connected state with a terminal, to a link to a target BS when the terminal moves from a serving cell belonging to the serving BS into a neighboring cell belonging to the target BS. Disconnecting the link to the serving BS before newly connecting the link to the target BS is referred to as Break Before Entry (BBE) or Break Before Make (BBM) handover. Disconnecting the link to the serving BS after newly connecting the link to the target BS is referred to as Entry Before Break (EBB) or Make Before Break (MBB) handover. The present disclosure illustrates only a handover method and apparatus when performing the EBB handover.

Hereinafter, embodiments of the present invention will be described below in detail with reference to the accompanying drawings where those components are rendered the same reference number that are the same or are in correspondence, regardless of the figure number, and redundant explanations are omitted.

A handover procedure may generally include three processes of a handover decision and initiation, a handover preparation and a handover execution. A terminal need to perform a pre-step of collecting information related to neighboring base stations prior to the handover decision and initiation, and may collect such information through scanning. The scanning of the terminal may be executed at an interval where the terminal is unable to communicate with a serving BS.

At the handover decision and initiation process, a terminal may be a main agent to decide and initiate handover or a base station may be a main agent to decide and initiate handover. The serving BS may decide handover from the perspective of load balancing by considering its own resources or cell conditions and initiate the handover by transmitting a handover command to the terminal. Here, the terminal may decide whether or not to execute the EBB handover according to the instruction (decision) of the base station.

FIG. 1 is a view illustrating a handover procedure in accordance with a handover command from a base station.

A serving BS may transmit a handover request message (HO-REQ) to a target BS when it determines that a handover of a terminal is required (S101).

The target BS may then transmit a handover response message (HO-RSP) to the serving BS (S103).

The serving BS and the target BS exchange information related to a target terminal for the handover, and negotiate resources, such as dedicated code, physical address (STID), security parameters and the like, which are to be assigned to the terminal by the target BS (HO-Negotiation). In some cases, the serving BS may transmit the HO-REQ message to a plurality of neighboring base stations and receive the HO-RSP message from the plurality of neighboring base stations so as to inform a terminal of a list of target base stations.

Upon completion of the HO-negotiation between the serving BS and the target BS, the serving BS may transfer a handover command message (HO-CMD) to the terminal (S105). The HO-CMD message may include information related to a network re-entry time for starting (initiating) the handover procedure (hereinafter, referred to as "action time"), a time for stopping DL/UL resource allocation from the serving BS to the terminal and disconnecting a link between the serving BS and the terminal (hereinafter, referred to as "disconnection time"), ID of a target BS, a service level expected to be provided to the terminal by the target BS, and the like.

After reception of the HO-CMD message, in some cases, the terminal may transmit a handover instruction message (HO-IND) to the serving BS (S107). For example, the terminal may transmit HO-IND message to the serving BS, upon occurrence of situations, for example, upon transmitting a list of target BSs including a list of a plurality of neighboring BSs from the serving BS to the terminal, upon transmitting target BS selection information to the serving BS, upon revoking the handover because all the target BSs are inappropriate as a handover target, upon failed to maintain a link to the serving BS until the disconnection time of disconnecting the link to the serving BS, upon revoking the handover due to other reasons, or the like.

After completion of the handover preparation, the terminal may execute the handover procedure with the target BS. That is, the terminal may execute the network re-entry process with the target BS according to the action time included in the HO-CMD message (S109). Here, the network re-entry process may be enabled through CDMA code ranging or ranging request (RNG-REQ) via a Medium Access Control (MAC) message.

Upon execution of the EBB handover, the terminal may be allowed to continuously communicate with the serving BS for an available interval (hereinafter, referred to as "AI"), which is an interval enabling communication (data transmission/reception) with the serving BS even while carrying out the network re-entry process with the target BS (S111). The terminal may execute the network re-entry process with the target BS for an unavailable interval (hereinafter, referred to as "UAI"), which is an interval disabling communication with the serving BS.

However, upon execution of the BBE handover, any AI and UAI intervals with the serving BS are not fixed, and a typical hard handover procedure may be carried out.

After completion of the network re-entry process between the target BS and the terminal (S109), the target BS may inform of the handover completion to the serving BS by transmitting a handover complete message (HO-CMPLT) to the serving BS (S113).

Afterwards, the terminal may disconnect (release) the link to the serving BS and set (establish) a link to the target BS (S117).

In accordance with another exemplary embodiment, the terminal may decide and initiate the handover when it reports a scanning measurement result to the serving BS, transmits the HO-REQ message to the serving BS, or determines that maintaining the current channel state is not appropriate due to a bad channel state with the serving BS. Even in this case, the terminal may decide whether or not to execute the EBB handover according to the decision of the base station.

Figure 2:
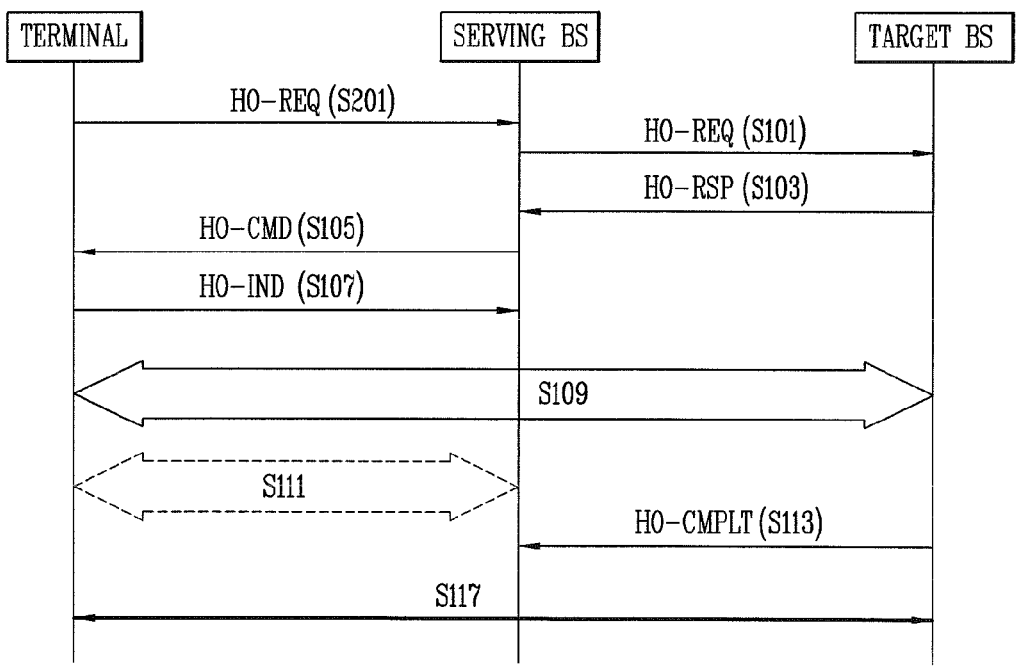
FIG. 2 is a view illustrating a handover procedure in accordance with a handover request sent by a terminal.

FIG. 2 is a view illustrating a handover procedure in accordance with a handover request sent by a terminal.

For example, the terminal may periodically receive information related to a neighboring BS from the serving BS while being located in a cell belonging to the current serving BS, and periodically scan Carrier to Interference and Noise Ratio (CINR) of a preamble signal transmitted from the neighboring BS. When the CINR value of the preamble signal transmitted from the serving BS is smaller than the CINR value of the neighboring BS, the terminal may recognize that handover is needed to be executed.

When the terminal recognizes the handover is needed to be executed, the terminal may transmit a HO-REQ message to the serving BS (S201).

Afterwards, the serving BS and the target BS perform the HO-negotiation process through transmission and reception of HO-REQ/HO-RSP. As aforementioned in FIG. 1, through the HO-negotiation process, the serving BS and the target BS exchange terminal-related information, and negotiate resources, such as dedicated code, physical address (STID), security parameters and the like, which are to be assigned to the terminal. In some cases, the serving BS may transmit the HO-REQ message to a plurality of neighboring BSs and receive the HO-RSP message from the plurality of neighboring BSs so as to inform a list of target BSs to the terminal.

The subsequent processes are the same as the processes described in FIG. 1, so detailed description thereof will be omitted.

Figure 3:
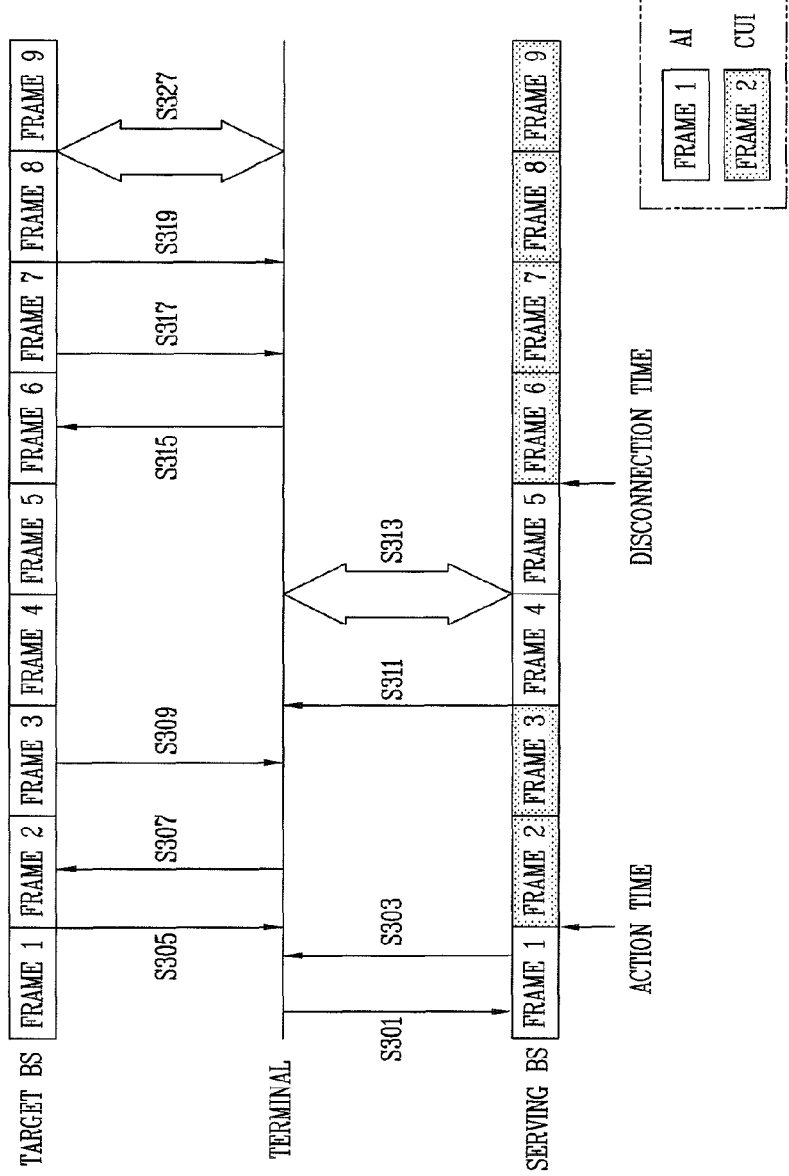
FIG. 3 is a view illustrating a process of executing EBB handover during data service.

FIG. 3 is a view illustrating a process of executing EBB handover during data service.

A terminal may exchange with a base station in advance information related to whether or not the EBB handover is supported and preferred while carrying out the network entry procedure, thereby deciding in advance whether or not to execute the EBB handover.

When the terminal decides that the handover is needed to be executed, the terminal may transmit a handover request message (HO-REQ) message to the serving BS (S-BS) (S301).

After completion of the HO-negotiation with a target BS (T-BS), the serving BS may transmit to the terminal a handover command message (HO-CMD) containing a list of target BSs, AI and UAI related information, action time and disconnection time, STID, service flow ID (FID) and the like (S303). As illustrated in FIG. 3, a network re-entry process to the target BS is initiated at frame 2, and the terminal has the UAI, at which the terminal is unable to communication with the serving BS, for intervals corresponding to frame 2 and frame 3 at which the terminal performs the network re-entry.

The target BS may transmit physical synchronization channel (PSCH) information and system information (SI) to the terminal (S305). Here, the target BS may establish downlink channel synchronization with the terminal through the PSCH.

The terminal may transmit a ranging request message (RNG-REQ) containing a CDMA code to the target BS (S307), and receive a response (ACK/NACK) to the request from the target BS (S309) to establish uplink channel synchronization.

Afterwards, when the UAI interval is completed, the serving BS may transmit DL/UL MAP to the terminal for transmission and/or reception of data such as VoIP and the like and allocate DL/UL resources to the terminal for AI (S311). As illustrated in FIG. 3, the terminal has AI, for which the terminal enables communication with the serving BS, at frame 4 and frame 5. The terminal may perform communication with the serving BS by utilizing the allocated resources from the serving BS for the AI (S313).

The serving BS may then terminate (stop) the DL/UL resource allocation to the terminal at the disconnection time instructed via the HO-CMD message, thereby disconnecting the link connected to the terminal.

Afterwards, the terminal may carry out a ranging request via a MAC message (S315), and receive from the target BS allocated resources such as physical address (STID), service flow ID (FID) and the like (S317). The MAC message may include terminal authentication, CQI information and the like.

Also, the target BS may allocate DL/UL resources to the terminal by transmitting DL/UL MAP for transmission and reception of data such as VoIP and the like (S319).

The terminal may then transmit/receive data such as VoIP and the like to/from the target BS using the allocated resources (S327).

However, referring to FIG. 3, when executing the EBB handover, the terminal may fail the ranging process (CDMA ranging or MAC message ranging) with the target BS at the UAI, which may cause the network re-entry to the target BS to be later than an expected disconnection time. In this situation or condition, use of a predetermined disconnection time is unnecessary, thereby causing a problem that a time for receiving a service from the serving BS is reduced until before a substantial network entry to the target BS. To prepare for the case, when a delay of an existing network re-entry time is occurred due to failure or erroneous situation of a procedure expected to be performed at the UAI, a way to reset a general network re-entry time by allowing the terminal to inform status information on the current situation to the serving BS is required.

Figure 4:
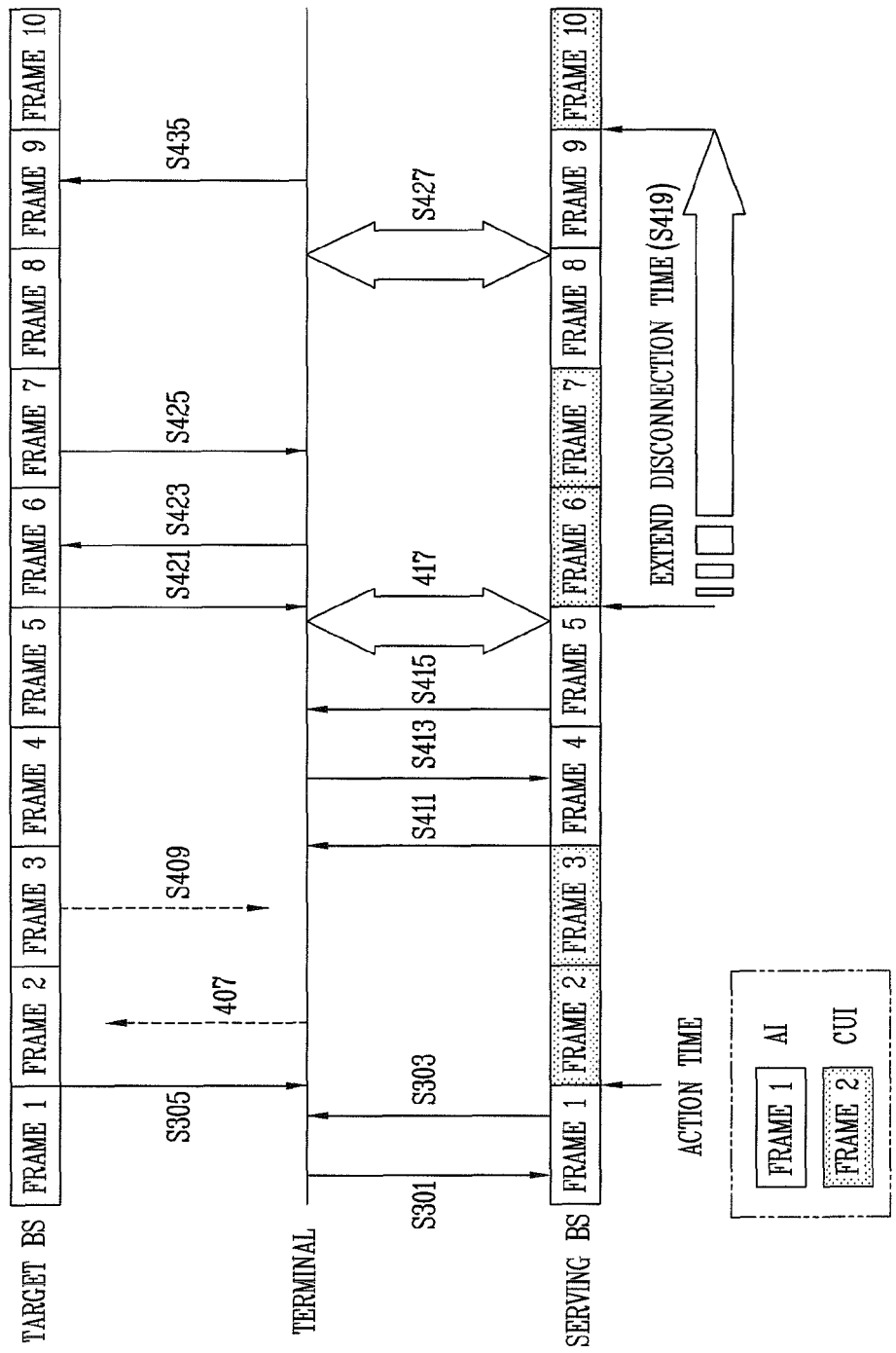
FIG. 4 is a view illustrating sequential steps of a handover procedure including a process of reporting handover status information to a serving BS when an error has occurred in the EBB handover in accordance with one exemplary embodiment.

FIG. 4 illustrates continuously receiving a data service from a serving BS by resetting a handover disconnection time when an error has occurred during EBB handover.

As described with reference to FIG. 3, the processes of handover request (S301), handover command (S303) and reception of PSCH and SI from the target BS (S305) are equally performed in FIG. 4.

Also, as described in FIG. 3, the terminal may receive from the serving BS an action time, a disconnection time, AI information and UAI information through a HD-CMD message for execution of EBB handover.

As described above, the disconnection time is an expected time that the terminal completes the network re-entry to the target BS. Thus, when an expected process has not been normally completed within the UAI, the terminal may face a situation of being unable to complete the network re-entry in a preset disconnection time. Accordingly, when an error has occurred in the process expected to be performed for the UAI or it is necessary to report a state of an ongoing process, the terminal may transmit such status information to the serving BS at the AI.

Referring to FIG. 4, the terminal may execute a CDMA code ranging process with the target BS at frame 2 and frame 3 as the UAI. When the target BS has failed to receive a ranging request message from the terminal (S407) or the terminal has failed to receive an ACK/NACK message for the ranging request from the target BS (S409), an error may be occurred in the network re-entry process.

Afterwards, the serving BS may allocate DL/UL resources to the terminal by transmitting DL/UL MAP at the AI (S411).

If the CDMA code ranging with the target BS has failed (S407), the terminal may report status information related to the CDMA code ranging failure to the serving BS for the AI (S413).

Upon reception of the status information, the serving BS may extend and reset a disconnection time such that the terminal can continuously receive a service from the serving BS while carrying out the network re-entry to the target BS. The serving BS may then transmit a response message, which includes information related to the reset disconnection time, UAI and AI, to the terminal (S415).

If the terminal has failed to receive the ACK/NACK message for the CDMA code ranging request from the target BS (S409), the terminal may report status information related to the failure to the serving BS (S413). After reception of the report, the serving BS may transmit a response message, which includes information related to the reset disconnection time, UAI and AI, to the terminal (S415).

If the terminal has failed the ranging through a MAC message (RNG-REQ/RSP) at the UAI, the terminal may transmit MAC message ranging failure information to the serving BS to make the serving BS reset the disconnection time, UAI and AI.

Upon the CDMA code ranging failure or MAC message ranging failure, the target BS may transmit error information to the terminal through a ranging response message (RNG-RSP) for the UAI. For example, upon the CDMA code ranging failure, the target BS may transmit information related to ranging parameter offset and the like to the terminal. Upon the MAC message ranging failure, the target BS may transmit information related to decoding or the like to the terminal through the ranging response message (RNG-RSP).

The terminal may report the error, which has occurred during the ranging process at the UAI, to the serving BS through a separate MAC management message (HO-STAT-REP) for the AI.

The separate MAC management message (HO-STAT-REP) may include information shown in the following Table 1.

TABLE 1

| Field | Description |
|---|---|
| UAI procedure type information | Information related to types of handover processes expected to be performed at UAI<br>CDMA code ranging<br>MAC message ranging<br>Extra network re-entry procedure (PKM, system information update, etc.) |
| Error information | Cause of failure and occurrence time point information related to error cause, ranging parameter offset or the like transmitted by target BS via RNG-RSP |
| Action request | Action requested by terminal to serving BS disconnection time reconfiguration UAI/AI reconfiguration |

Also, if the terminal has information related to an error, which has occurred in the ranging process at UAI, to transmit to the serving BS in uplink for AI, the terminal may report to the serving BS the error-occurred UAI information, namely, UAI procedure type information and error information, using a piggyback through a specific sequence or data information.

Also, upon CQICH report to the serving BS at AI, the terminal may report to the serving BS the UAI information, namely, UAI procedure type information and error information, through a specific sequence.

The serving BS and the terminal continuously perform communication with each other at frame 4 and frame 5 as the AI (S417). Even after completion of the AI, the disconnection time may extend over frame 9 according to the reset (reconfigured) disconnection time, UAI and AI, and frame 6 and frame 7 correspond to a new UAI(S419).

Accordingly, the terminal and the serving BS may not disconnect the connected link. The terminal may receive PSCH and system information (SI) from the target BS for the UAI (S421), re-perform the previous CDMA code ranging (S423), and receive a response message to the ranging (S425).

Afterwards, upon completion of the UAI, another AI is started, and the terminal may execute data transmission/reception to/from the serving BAS for the AI (S427). Afterwards, the terminal may transmit a ranging request message to the target BS through the MAC message (S435), to complete the network re-entry to the target BS. As illustrated in FIG. 4, the disconnection time extends over the frame 9, so the terminal is able to continuously transmit/receive data to/from the serving BS for frame 8 and 9 corresponding to the AI.

Meanwhile, the method according to the present disclosure, as described so far, can be implemented by hardware or software, or any combination thereof. For example, the method according to the present disclosure may be stored in a storage medium (e.g., an internal memory of a mobile terminal, a flesh memory, a hard disc, etc.). Alternatively, the method according to the present disclosure can be implemented as codes or command words within a software program capable of being executed by a processor (e.g., a microprocessor within a mobile terminal).

The invention claimed is:

1. A method for a User Equipment (UE) to perform handover in a mobile communication system, the method comprising:
receiving a handover command message from a serving base station (BS), the handover command message containing information related to a target BS, information related to an available interval enabling data transmission to and data reception from the serving BS during handover, information related to an unavailable interval not enabling data transmission or reception during handover and information related to time of disconnection of a link with the serving BS;
performing a network entry process with the target BS;
transmitting status information to the serving BS when an error has occurred in the network entry process;
receiving a status information response message from the serving BS, the response message containing available interval and unavailable interval reset information and reset link disconnection time information for extending the link disconnection time;
enabling the serving BS to provide a data transmitting and receiving service during the available interval; and
re-performing the network entry process with the target BS and disconnecting the link at the reset link disconnection time,
wherein the status information contains at least information related to a type of the network entry process, information related to a cause and an occurrence time of the error, or action request information requested from the serving BS.

2. The method of claim 1, wherein the handover command message further contains information related to a level expected to be provided by the target base station BS and information related to an action time for initiating the network entry process.

3. The method of claim 1, wherein the status information is transmitted by being included in a Medium Access Control (MAC) management message, a piggyback or a Channel Quality Indicator Channel (CQICH).

4. The method of claim 1, wherein the network entry process is a Code Division Multiple Access (CDMA) code ranging or a ranging process through a Medium Access Control (MAC) message.

5. The method of claim 4, further comprising receiving error information from the target BS via a ranging response message when the CDMA code ranging or the MAC message ranging has failed.

* * * * *